US012555437B2

(12) United States Patent
Huguenin et al.

(10) Patent No.: US 12,555,437 B2
(45) Date of Patent: Feb. 17, 2026

(54) METHOD, DEVICE AND COMPUTER PROGRAM FOR MANAGING GAMING WINNINGS AND MONITORING IN A MULTI-GAME COMPONENT OR COMPUTER SYSTEM

(71) Applicant: FDJ GAMING SOLUTIONS FRANCE, Boulogne-Billancourt (FR)

(72) Inventors: Olivier Huguenin, Villiers Saint Frederic (FR); Eric Meynieux, Ventabren (FR)

(73) Assignee: FDJ GAMING SOLUTIONS FRANCE, Boulogne-Billancourt (FR)

( * ) Notice: Subject to any disclaimer, the term of this patent is extended or adjusted under 35 U.S.C. 154(b) by 268 days.

(21) Appl. No.: 18/026,358

(22) PCT Filed: Sep. 14, 2021

(86) PCT No.: PCT/FR2021/051574
§ 371 (c)(1),
(2) Date: Mar. 15, 2023

(87) PCT Pub. No.: WO2022/058676
PCT Pub. Date: Mar. 24, 2022

(65) Prior Publication Data

US 2023/0377414 A1 Nov. 23, 2023

(30) Foreign Application Priority Data

Sep. 16, 2020 (FR) ........................................ 2009367

(51) Int. Cl.
*G07F 17/32* (2006.01)

(52) U.S. Cl.
CPC ...... *G07F 17/3244* (2013.01); *G07F 17/3225* (2013.01); *G07F 17/329* (2013.01)

(58) Field of Classification Search
CPC ............. G07F 17/3244; G07F 17/3225; G07F 17/329; G07F 17/326; G07F 17/3267; G07F 17/42; A63F 3/065; A63F 3/081
(Continued)

(56) References Cited

U.S. PATENT DOCUMENTS

2009/0093300 A1* 4/2009 Lutnick ............... G07F 17/3293 463/31
2009/0104963 A1* 4/2009 Burman .............. G07F 17/3223 463/22

(Continued)

FOREIGN PATENT DOCUMENTS

EP 3 098 788 11/2016

OTHER PUBLICATIONS

International Search Report dated Jan. 5, 2022, for PCT/FR2021/051574, 5 pages., including English translation.

(Continued)

*Primary Examiner* — Pierre E Elisca
(74) *Attorney, Agent, or Firm* — NIXON & VANDERHYE

(57) ABSTRACT

Disclosed is a method of managing game winnings in a computer system including several independent gaming modules and a winnings management module distinct from the gaming modules, the winnings management module being configured for: obtaining a winnings information item, relating to participation in a first game type, and an information item on eligibility for a second game type, the information items obtained on winnings and eligibility being received from a first gaming module obtained according to a ticket identifier; obtaining a winnings information item relative to a participation in the second game type in relation with the ticket identifier, the winnings information item relative to the participation in the game of the second type (Continued)

being obtained from a second gaming module associated with the game of the second type; and estimating winnings associated with the identifier of the ticket according to the winnings information items received.

20 Claims, 5 Drawing Sheets

(58) Field of Classification Search
USPC ........................................................... 463/25
See application file for complete search history.

(56) References Cited

U.S. PATENT DOCUMENTS

| | | | | |
|---|---|---|---|---|
| 2011/0275432 | A1* | 11/2011 | Lutnick | G07F 17/3244<br>463/25 |
| 2017/0249806 | A1* | 8/2017 | Lutnick | G07F 17/3293 |
| 2019/0019373 | A1* | 1/2019 | Fox | G07F 17/3239 |

OTHER PUBLICATIONS

Written Opinion of the ISA dated Jan. 5, 2022, for PCT/FR2021/051574, 6 pages.

* cited by examiner

METHOD, DEVICE AND COMPUTER PROGRAM FOR MANAGING GAMING WINNINGS AND MONITORING IN A MULTI-GAME COMPONENT OR COMPUTER SYSTEM

CROSS-REFERENCE TO RELATED APPLICATION(S)

This application is the U.S. national phase of International Application No. PCT/FR2021/051574 filed Sep. 14, 2021 which designated the U.S. and claims priority to FR 2009367 filed Sep. 16, 2020, the entire contents of each of which are hereby incorporated by reference.

BACKGROUND OF THE INVENTION

Field of the Invention

The invention relates to the field the management of games in multi-game computer systems, and in particular to the management of winnings and to the operations performed during the life cycle of a gaming ticket. The invention applies in particular to games with an additional part and in particular to physical games comprising participation in physical games such as scratch card games or lottery games followed by additional digital games such as raffle games or instant games.

Description of the Related Art

It is noted that the implementation of physical games accessible to a player using a ticket (physically-based, for example a scratch card or a lottery ticket or receipt, or a virtual also called "e-ticket") generally requires establishing a communication link between a game engine in charge of managing a main game (main game engine) and a game engine in charge of managing an additional game (additional game engine). The participation in the additional game is then initiated by the main game engine but handled by the additional game engine. Thus, in particular, when the games implemented make it possible to take winnings, the winnings of the main game are determined in the main game engine, these being for example predetermined winnings, while the component or winnings of the additional game are determined in the additional game engine, for example randomly. In numerous existing systems, the additional game engine is thus configured to exchange data with the main game engine, for example to receive data relative to a participation in the additional game and to send possible winnings associated with that participation in the additional game, in order for the main game engine to be able to update a status of the ticket, calculate the total winnings associated with the ticket and enable the player to receive the winnings at the point of sale.

While these systems give general satisfaction, they require interactions (or subscriptions) between the game engines which constitute a hindrance to the development of physical games and generate additional costs. As a matter of fact, the development of an additional game, also called add-on, as an adjunct to the main game, involves modifying both engines to enable a communication link to be established between the two. On top of the additional development costs, establishing communication links between gaming modules may be at the origin of supply problems (if for example the suppliers of modules are different), integration difficulties when several stakeholders are to be involved, increased complexity of the test phases and increased operating risk.

There is thus a need to simplify the management of winnings and the monitoring of the operations carried out during the life cycle of a ticket in multi-game systems, in particular for physical games.

The present invention is directed in particular to solving these problems.

SUMMARY OF THE INVENTION

To that end, the invention provides an autonomous module for the management of winnings and the tracing of tickets (real or virtual) capable of interfacing with independent gaming modules (also called "game engines") for the purposes of coordinating their use in relation to a gaming ticket, in particular making it possible to identify additional games, to calculate winnings from several games and to monitor operations carried out during the life cycle of a ticket.

There is thus provided a method for managing game winnings in a computer system comprising a plurality of independent gaming modules and a winnings management module distinct from the gaming modules, the method being implemented in the winnings management module and comprising:

- obtaining a winnings information item, relating to a participation in a game of a first type, and an information item on eligibility for a game of a second type, the game of the second type being different from the game of the first type, the information items obtained on winnings and eligibility being received from a first gaming module associated with the game of the first type and being obtained according to at least one identifier of a ticket;
- obtaining a winnings information item relative to a participation in the game of the second type in relation with the identifier of the ticket, the winnings information item relative to the participation in the game of the second type being obtained from a second gaming module associated with the game of the second type; and
- estimating winnings associated with the identifier of the ticket according to the winnings information items received.

The method according to the invention thus makes it possible to simplify the development of gaming modules and avoid any direct interaction between those gaming modules. The management of the winnings associated with the first game and with the second game is centralized at the winnings management module.

According to particular embodiments, the method further comprises sending, to the second gaming module, a registration request for registering a participation in the second game, the registration request being associated with the identifier of the ticket.

Still according to particular embodiments, the method further comprises sending the estimated winnings, an instruction for payment of the estimated winnings and a modification of a status associated with the ticket.

Still according to particular embodiments, obtaining a winnings information item comprises querying a data structure received in advance of the participation in the game at the origin of the winnings considered.

Still according to particular embodiments, obtaining a winnings information item comprises sending a request comprising the identifier of the ticket to a gaming module and receiving the winnings information item considered.

Still according to particular embodiments, the method further comprises determining a status associated with the ticket.

Still according to particular embodiments, estimating winnings associated with the identifier of the ticket according to the winnings information items obtained is carried out according to the status associated with the ticket.

Still according to particular embodiments, the ticket is a physically-based ticket, in particular a scratch card, or a virtual ticket.

A computer program, implementing all or part of the method described above, installed on a preexisting item of equipment, is in itself advantageous, since it makes it possible to access and select, easily and rapidly, an event which may be of interest to a user.

Thus, the present invention also relates to a computer program comprising instructions for implementing the method described above, when that program is executed by a processor.

This program may use any programming language (for example an object language or other language) and be in the form of interpretable source code, a partially compiled code or a fully compiled code.

Another aspect relates to a non-transient medium for storing a computer-executable program, comprising a set of data representing one or more programs, said one or more programs comprising instructions for carrying out all of or part of the method described above on executing said one or more programs by a computer comprising a processing unit coupled operatively to memory means and to an input/output interface module.

BRIEF DESCRIPTION OF THE DRAWINGS

Other features, details and advantages of the invention will appear on reading the following detailed description. This description is purely illustrative and must be read with regard to the accompanying drawings, in which.

DETAILED DESCRIPTION OF THE INVENTION

According to particular embodiments of the invention, a module for managing winnings and for monitoring operations associated with a ticket (real or virtual) is implemented to interface between different independent gaming modules. The module for managing winnings and for monitoring operations also makes it possible to offer a player, upon instruction by a first gaming module, to participate in one or more other games, different from the first. A ticket here is a document that is pre-printed or partially pre-printed, which may comprise a predetermined identifier, or a document created (or issued) on registration of a participation in a game, to which an identifier is attributed.

Figure 1:
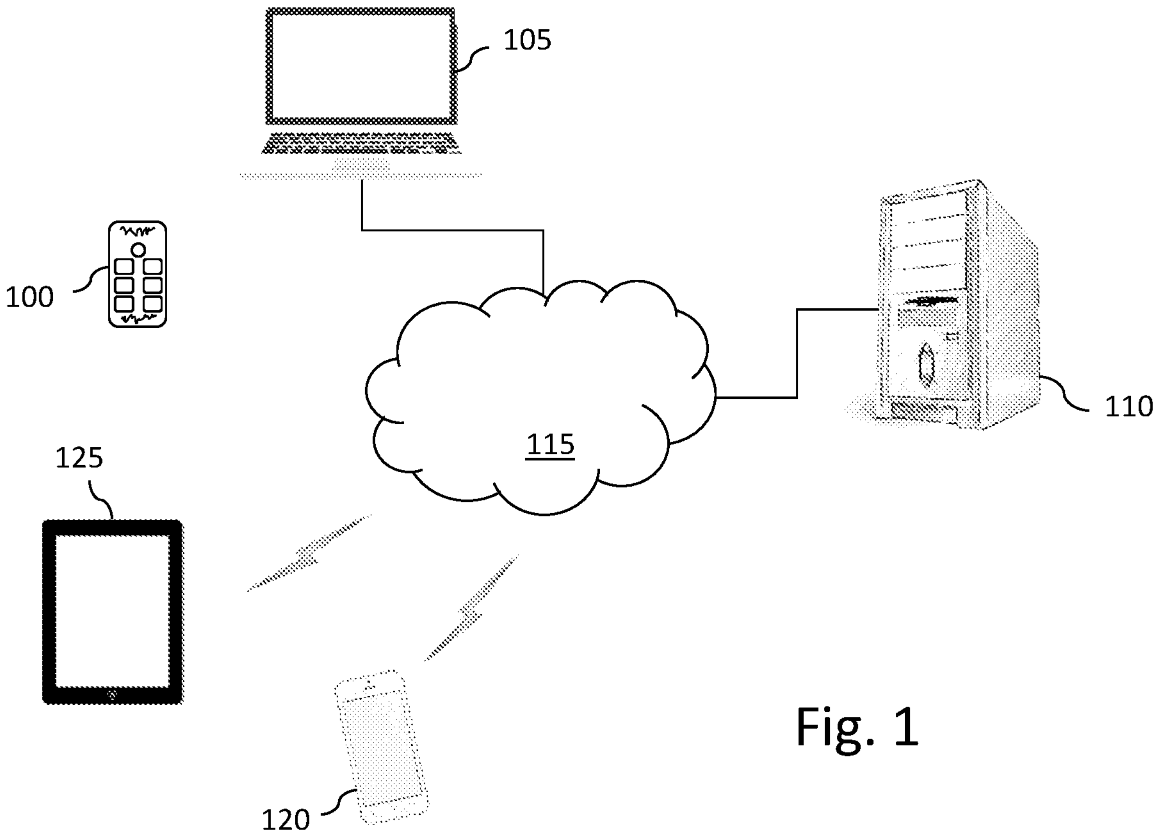
FIG. 1 illustrates an example of an environment in which the invention may be implemented according to particular embodiments.

FIG. 1 illustrates an example of an environment in which the invention may be implemented according to particular embodiments. As shown, a user is able to purchase a game ticket 100, for example at a point of sale also called POS. This may, for example, be a ticket of a scratch-card game or a lottery ticket on which the player has to select numbers. The ticket may be real or virtual. It typically comprises a unique identifier. This identifier is used to know whether or not the player has won and to determine a status. By way of illustration, a ticket may be in a payable state, an already paid state or a state that is blocked, for example if it has been declared stolen. According to particular embodiments, a ticket identifier comprises an identifier of the game with which the ticket is associated, the identifier of the game being coded or not coded.

To know whether he or she has won, a player may go to a point of sale provided with a terminal 105 connected to a server 110 of the manager of the game considered, via a communication network 115. The terminal 105 comprises entry means such as a keyboard or means for reading such as a scanner or an RFID reader to obtain the identifier of a ticket. It also comprises means for sending requests to the server 110, in particular requests comprising ticket identifiers. Thus, after having obtained the identifier of a ticket, the terminal 105 is able to send a request to the server 110, comprising the identifier, to know the amount of the winnings and the status of the ticket. In reply, the terminal receives the information on winnings and status. The point of sale can then pay the winnings, if any, to the player (it being noted that only sums less than a predetermined threshold are paid by the point of sale in cash, higher sums generally being settled by the game manager by check or bank transfer).

Alternatively, a player can use a personal device, for example a smartphone 120, a tablet 125 or a personal computer (not shown) to know the amount of the winnings and the status of a ticket (a payment of winnings is still generally made in a point of sale). For these purposes, he may use a specific application or a web interface.

This specific application or this web interface may also be used to offer participation in a second game to the player. As a matter of fact, after having sent a result of a participation in a first game associated with the ticket considered, or simultaneously, the server 110 is able to send a notification that a possibility is given to the user who holds the ticket considered, to participate in a second game, also called add-on. This may, for example, be a game of “double or quits” type or a game of “second chance” type if the player lost in participating in the first game. The player can then register his or her participation in that second game using the specific application or the web interface. Such a possibility may also be offered to a player at a point of sale. According to particular embodiments, the registration of the participation of a player in a second game is made automatically, for example when a player consults his or her ticket on the specific application or the web interface.

Figure 2:
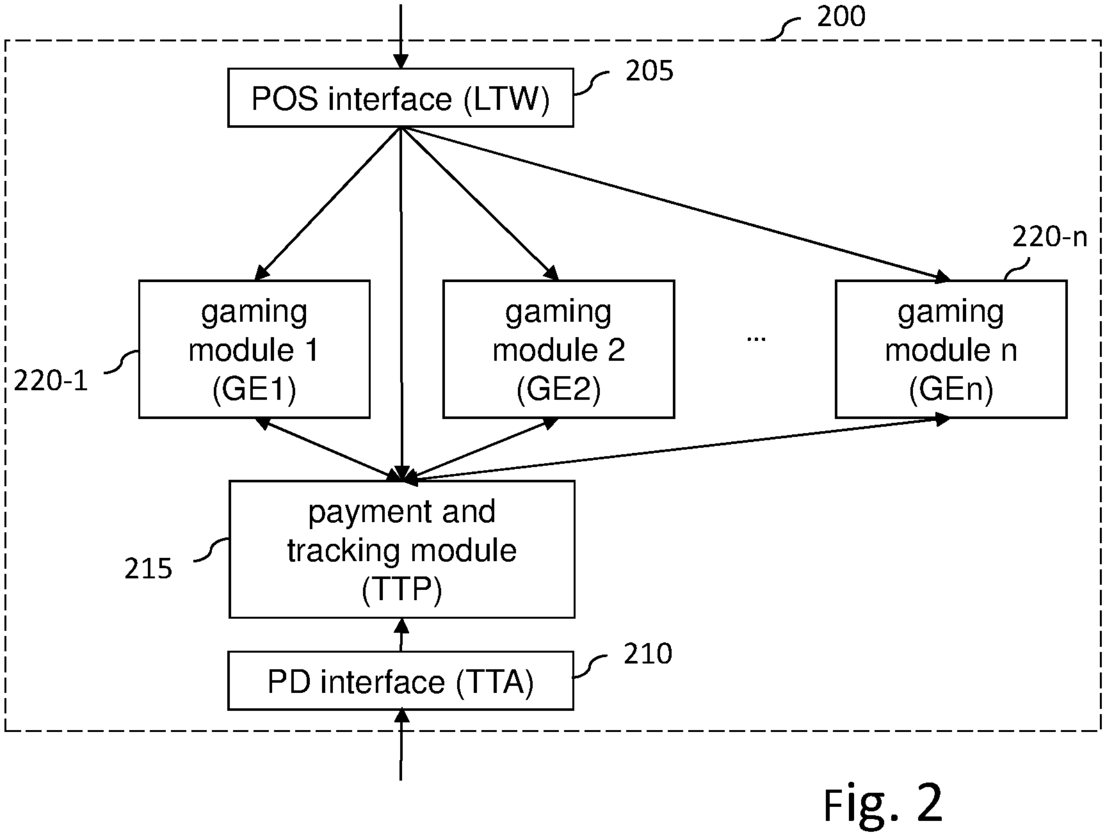
FIG. 2 illustrates an example of logic architecture of a multi-game computer system according to particular embodiments of the invention.

FIG. 2 illustrates an example of logic architecture of a multi-game computer system according to particular embodiments of the invention. This architecture may be implemented, for example, in a server 110 illustrated in FIG. 1. According to other embodiments, it is implemented in a distributed system comprising several servers.

As illustrated, the multi-game computer system 200 comprises a point of sale interface 205, denoted LTW (abbreviation of lottery widgets), and a user interface 210, denoted TTA (abbreviation of ticket tracker application). A point of sale or POS may thus connect to a computer system 200 via the interface 205 and a personal device denoted PD, such as a smartphone or a tablet, may connected to the computer system 200 via the interface 210.

The interfaces 205 and 210 are connected to a payment and tracking module 215, denoted TTP (abbreviation for ticket tracking and payment), itself connected to distinct gaming modules 220-1 to **220-*n*, denoted GE (abbreviation for game engine). Furthermore, the interface 205 is connected to the gaming modules 220-1 to 220-*n*** to manage a participation of a player in the corresponding game.

It is observed forthwith that all the payment and status information obtained by a point of sale is obtained via the payment and tracking module 215 and not directly (the direct connection between the interface 205 and the gaming modules 220-1 to **220-*n*** is not used to directly communicate the information on winnings or status to a terminal of a point of sale. It is also observed that the gaming modules are independent and do not exchange data directly between them, in particular data relating to winnings or to tracking of operations carried out by the gaming modules.

The interface 205 in particular makes it possible to query the module 215 to know the status of a ticket and an amount of winnings for one or more games. This information can thus be given to a player visiting a point of sale with his or her ticket the identifier of which is used to determine the status and the amount of the winnings. The interface 205 also makes it possible to request the change in status of a ticket from the module 215, for example after payment of the winnings. The interface 205 may furthermore be used to inform a point of sale of the possibility for a player to participate in a second game, further to the participation in a first game, and to register the participation of the player in that second game.

Similarly, the interface 210 makes it possible to query the module 215 to know the status of a ticket and an amount of winnings for one or more games. This information can thus be displayed on a player's personal device using a specific application or via a web interface after inputting the identifier of the ticket (by the user or by reading the ticket). The interface 210 may also be used to inform the player of the possibility of participating in a second game, further to the participation in a first game, and to register his or her participation in that second game.

The module 215 is in particular directed to the management of winnings resulting from participations in games, in particular the management of winnings resulting from participations in games associated, directly or indirectly, with a same ticket. According to particular embodiments and/or types of games, for example for games of scratch card type, each gaming module concerned sends a list of winners, for example identified by ticket identifiers, and the amounts of associated winnings, to the module 215. The latter can then determine, in response to a request coming from a point of sale or a player's personal device, and based on a ticket identifier, whether a player has won or not and the amount of the winnings, if any. According to other embodiments and/or types of games, for example prize draws, the module 215 sends a request comprising a ticket identifier to a gaming module which replies with a ticket status and/or a game result which may include an amount of winnings.

The module 215 also has the purpose of monitoring operations carried out during the life cycle of a ticket, in relation with the participation in games associated with a same ticket. It may in particular, based on an information item received from a first gaming module, offer participation in a game managed by a second gaming module different from the first, and register a player for the second game, for example using an identifier of a ticket corresponding to the first game. The module 215 is thus able to store in memory a game history associated with each ticket. This history may in particular be consulted by the manager of the multi-game system, for example for purposes of monitoring, auditing or marketing.

The gaming modules 220-1 to **220-*n* advantageously do not comprise payment functions, these being remotely located or decentralized in the module 215. In addition to the usual game functions, they therefore comprise an interface, preferably standardized, with the module 215**.

Figure 3:
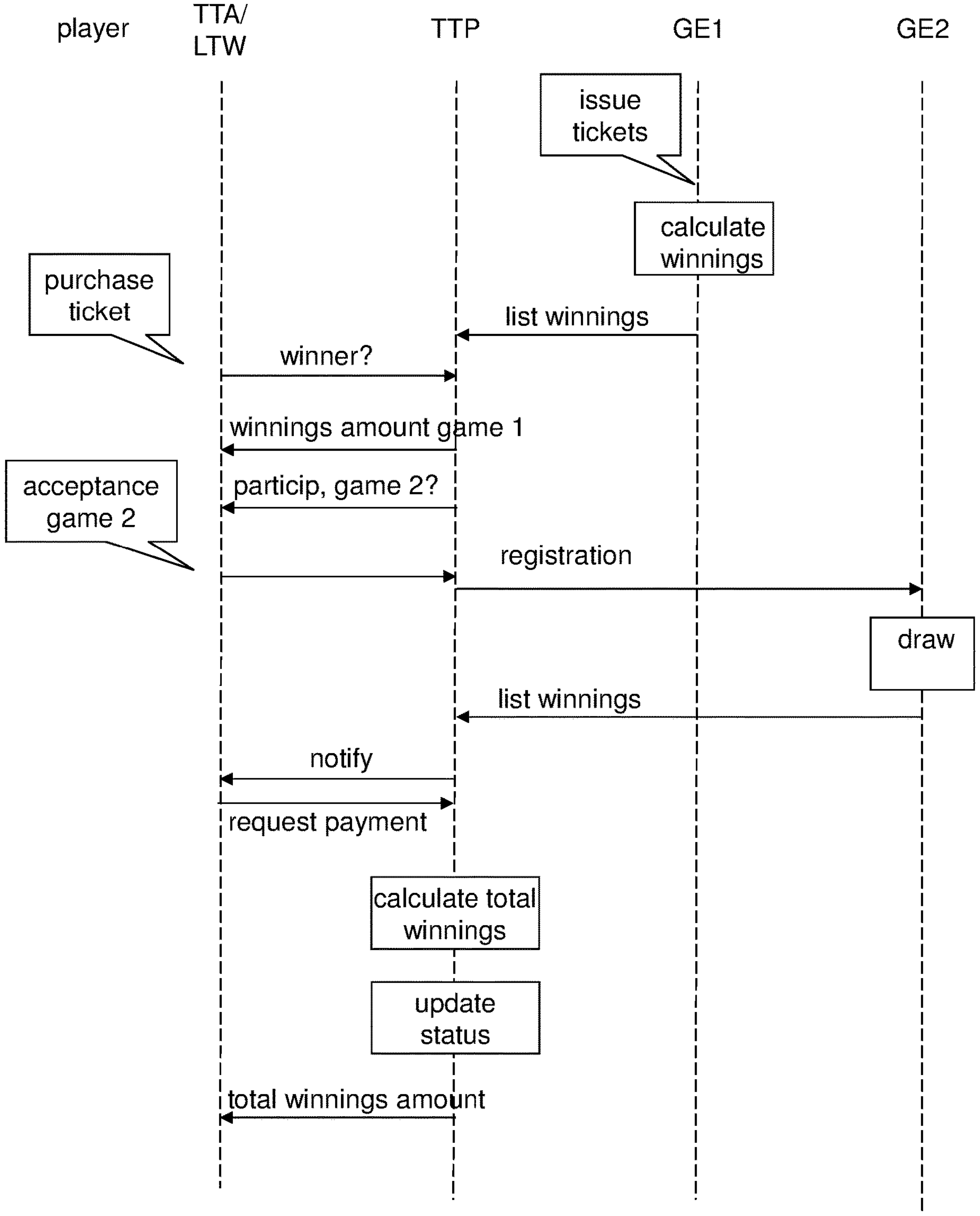
FIG. 3 illustrates a first example of a timing diagram of steps of the method of the invention according a first particular embodiment.

FIG. 3 illustrates a first example of a timing diagram of steps of the method of the invention according to a particular embodiment, between a user interface (TTA) or point of sale interface (LTW), the payment and tracking module (TTP) and two gaming modules (GE1 and GE2).

It is noted that if the payment and tracking module (TTP) is accessed here via the user interface (TTA) or the point of sale interface (LTW), it may be accessed via other interfaces.

According to this example, it is considered that a player can purchase a ticket giving him or her the right to play an instant game (game 1), for example a scratch-card game, implemented, here, in the gaming module GE1, and if he or she has lost, to play a second chance game (game 2), for example a lottery game implemented, here, in the gaming module GE2.

On issuing tickets, the corresponding gaming module (GE1) determines the number of winning tickets and associated winnings. The winnings or the list of the winning tickets and associated winnings, according to the game, are sent to the payment and tracking module (TTP). In addition, an information item according to which a player having a ticket to play that game furthermore has the right to play the second game (game 2), with the conditions for participation in the second game as may be appropriate, for example only if the player has lost, is sent to the payment and tracking module (TTP). This list and this information item (for example an identifier of the second game) are stored here by the payment and tracking module (TTP).

When a player purchases a ticket and participates in the game, he or she queries the multi-game system, from a personal device or a point of sale, to know whether he or she has won. For these purposes, a request comprising the identifier of the ticket is sent to the payment and tracking module (TTP) via the user interface (TTA) or point of sale interface (LTW). In response to the reception of the request, the payment and tracking module (TTP) determines whether the ticket is a winning ticket or not, and, if so, obtains the amount of the winnings. Furthermore, it determines the status of the ticket to check the rights of the player, for example if he or she has a right to be paid winnings and play a second game, that is to say, for example, if the ticket is in a payable state. It also determines, from information received from the gaming module, that the player has the possibility of playing the second game and, if the player is not already entered, to offer him or her to participate therein.

If the player accepts to participate therein, it notifies this to the payment and tracking module (TTP) via the user interface (TTA) or the point of sale interface (LTW) with, if appropriate, game information, for example a combination of numbers played in the lottery. The payment and tracking module (TTP) then registers the player with the corresponding gaming module (GE2).

After making a draw, the gaming module (GE2) determines the winnings or the winning tickets and the associated winnings, according to the game, and sends the list of the winning tickets and of the associated sets of winnings or single winnings to the payment and tracking module (TTP). The latter can then inform the winners via their personal device. It is noted here that the lists associated with the first and the second games may be independent lists or may be combined into a same list. Similarly, these lists may comprise information relative to all the tickets or may only comprise information relative to winning tickets, the tickets not present in the list then being considered as losing tickets.

Further to receiving result information, a player may request payment of the winnings. This request is sent to the payment and tracking module (TTP) via the point of sale interface (LTW). On reception of this request, the payment and tracking module (TTP) checks the status of the ticket using its identifier. The status may be checked with each of the gaming modules associated with the games in which the player has participated or with the payment and tracking module (TTP) itself, the latter then producing a synopsis of the status of the ticket in each of the gaming modules associated with the games in which the player has participated.

If the ticket is not in a payable state, the player is informed. If, on the contrary, the ticket is in a payable state, the payment and tracking module (TTP) calculates the amount of the winnings due by querying the lists concerned, here the list associated with the game concerned by the ticket (game 1) and the list associated with the game concerned by the ticket (game 2) if the player has participated in the latter. The payment and tracking module (TTP) then modifies the status of the ticket which becomes already paid and informs the point of sale of the amount of the winnings to pay (in order for the player to be paid). The status modification is carried out in the payment and tracking module (TTP) and/or in each of the gaming modules associated with the games in which the player has participated.

The payment and tracking module (TTP) thus centralizes the payment of the winnings relative to several participations in games, here a main game and a secondary game.

Figure 4:
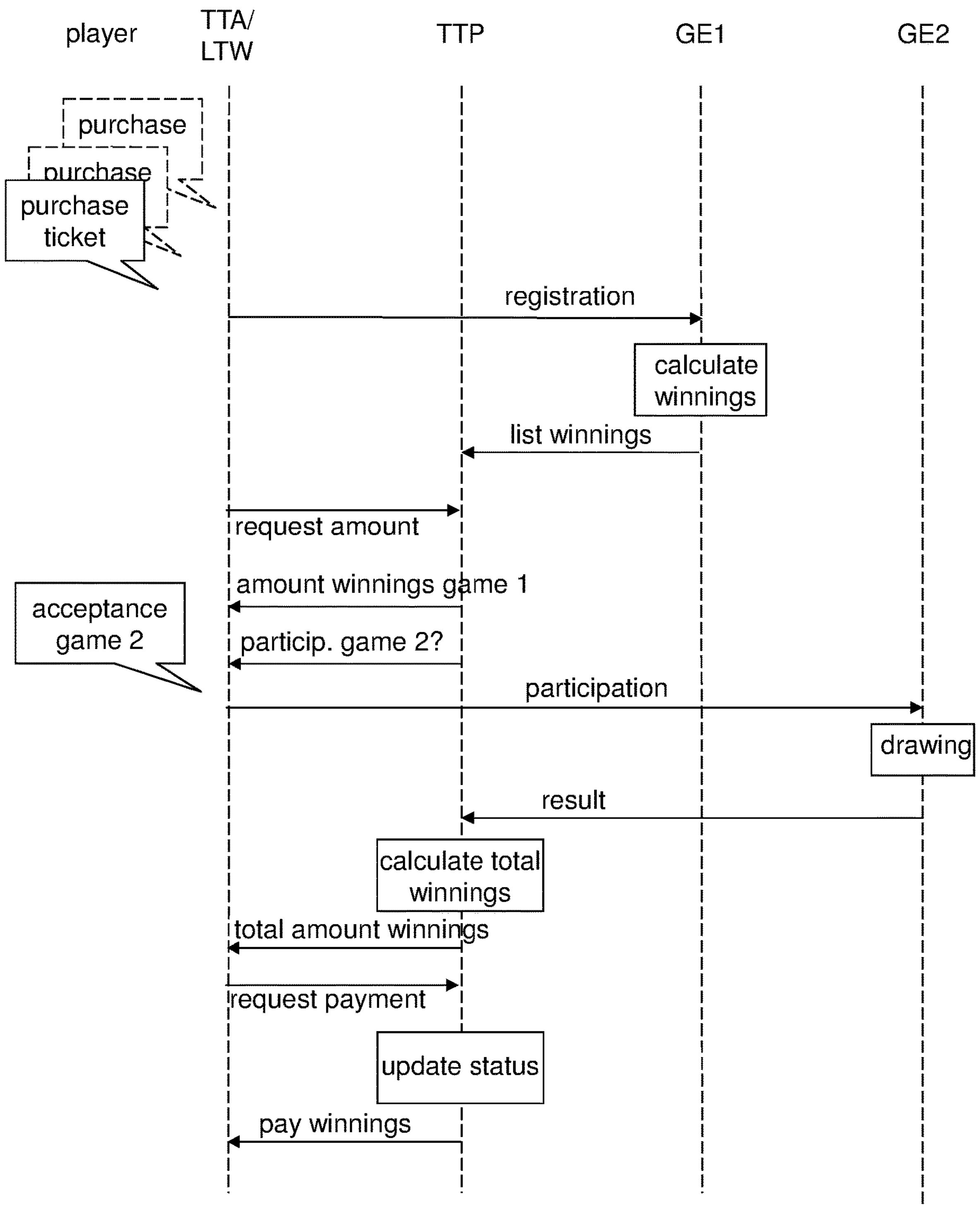
FIG. 4 illustrates a second example for a timing diagram of steps of the method of the invention according a second particular embodiment.

FIG. 4 illustrates a second example of a timing diagram of steps of the method of the invention according to a second particular embodiment, again between a user interface (TTA) or point of sale interface (LTW), the payment and tracking module (TTP) and two gaming modules (GE1 and GE2).

According to this example, it is considered that a player can purchase a ticket giving him or her the right to play a lottery type game (game 1), implemented, here, in the gaming module GE1, and if he or she has won, to play a game of double or quits type (game 2) implemented, here, in the gaming module GE2. Thus, contrary to the second game of FIG. 3 which is a game with differed participation, the second game of FIG. 4 is a game with immediate participation.

As illustrated, each lottery ticket played is registered in the corresponding gaming module (GE1). At the close of the game, a draw is carried out and the gaming module identifies the winning ticket or tickets, based on their identifier, and the amount of the associated winnings. The list of the winning tickets and of the associated winnings is sent to the payment and tracking module (TTP). In addition, an information item according to which a player having a ticket to play that game furthermore has the right to play the second game (game 2), with the conditions for participation in the second game as may be appropriate, for example only if the player has won, is sent to the payment and tracking module (TTP). This list and this information item (for example an identifier of the second game) are stored here by the payment and tracking module (TTP). According to particular embodiments, the latter can then inform the winners via their personal device.

After the winnings of a lottery game have been determined, a player can request the amount of his or her winnings. For these purposes, a request comprising the identifier of the ticket is sent to the payment and tracking module (TTP) via the user interface (TTA) or point of sale interface (LTW). In response to the reception of the request, the payment and tracking module (TTP) determines whether the ticket is a winning ticket or not, and, if so, obtains the amount of the winnings. Furthermore, it determines the status of the ticket to check the rights of the player, for example if he or she has a right to be paid winnings and play a second game, that is to say, for example, if the ticket is in a payable state. It also determines, from information received from the gaming module, that the player has the possibility of playing the second game and, if the player is not already entered, to offer him or her to participate therein.

If the player accepts to participate therein, he or she notifies this to the payment and tracking module (TTP) via the user interface (TTA) or the point of sale interface (LTW). The payment and tracking module (TTP) then sends a participation request to the corresponding gaming module (GE2).

After drawing, the gaming module (GE2) is able to indicate to the payment and tracking module (TTP) whether the player has won or lost. It can also indicate this directly to the user, for example according to the game (e.g. an instant participation game or differed participation game). If it has received the result, the payment and tracking module (TTP) stores it in memory, calculates the amount of the winnings due by querying the list associated with the game concerned by the ticket (game 1), applying the result of the second game and preferably informs the player thereof.

The player can then request the payment of the those winnings. This request is sent to the payment and tracking module (TTP) via the point of sale interface (LTW). On reception of this request, the payment and tracking module (TTP) checks the status of the ticket using its identifier. If the ticket is not in a payable state, the player is informed. If, on the contrary, the ticket is in a payable state, the payment and tracking module (TTP) calculates, if necessary, the amount of the winnings due by interrogating the list associated with the game concerned by the ticket (game 1), applying the result of the second game if the player has participated in the latter. The payment and tracking module (TTP) then modifies the status of the ticket which becomes already paid and informs the point of sale of the amount of the winnings to pay (in order for the player to be paid). Again, the status modification is carried out in the payment and tracking module (TTP) and/or in each of the gaming modules associated with the games in which the player has participated.

According to particular embodiments, the game rules and calculation of the winnings, specific to each game, are managed autonomously by the gaming modules while the payment of the winnings is managed in centralized manner by the payment and tracking module which furthermore coordinates the participations in the different games according to the rules specific to each game.

A ticket status is managed here by the module of the main game associated with the ticket concerned and, preferably, by each gaming module associated with the games in which the holder of the ticket has participated. This status is, for example, in a payable state when the winnings have been determined, in a blocked state if, for example, the ticket has been declared stolen or in a standby state when the winnings have not yet been calculated. The ticket status is, preferably, updated by the gaming module itself according to standard rules.

Moreover, a winnings status is managed by the payment and tracking module for each ticket associated with one or more winnings. The winnings status is managed by the payment and tracking module according to payment rules specific to it.

As soon as a player connects to the payment and tracking module, for example to know winnings associated with a ticket, for example via a user interface or via a point of sale interface, the game module with which is associated the ticket is queried, using the identifier of the ticket, to determine the status of the ticket for that game and possible eligibility to participate in a second game. If, in reply, the payment and tracking module is informed of an eligibility to participate in a second game, it can query the gaming module associated with the latter, using the same ticket identifier to determine a possible participation in that second game and, as may be appropriate, the status of the ticket for that second game and a possible eligibility to participate in a third game. Thus, from one to the next, the payment and tracking module is able to determine the participation of the holder of the ticket in different games and the status of the ticket for those different games. The winnings are preferably sent to the payment and tracking module as of participation in the game (immediate participation game) or when the winnings have been determined (game with deferred participation). The payment and tracking module thus stores in memory only the winnings in connection with ticket identifiers and determines the operations associated with a same ticket by querying the gaming modules concerned.

Figure 5:
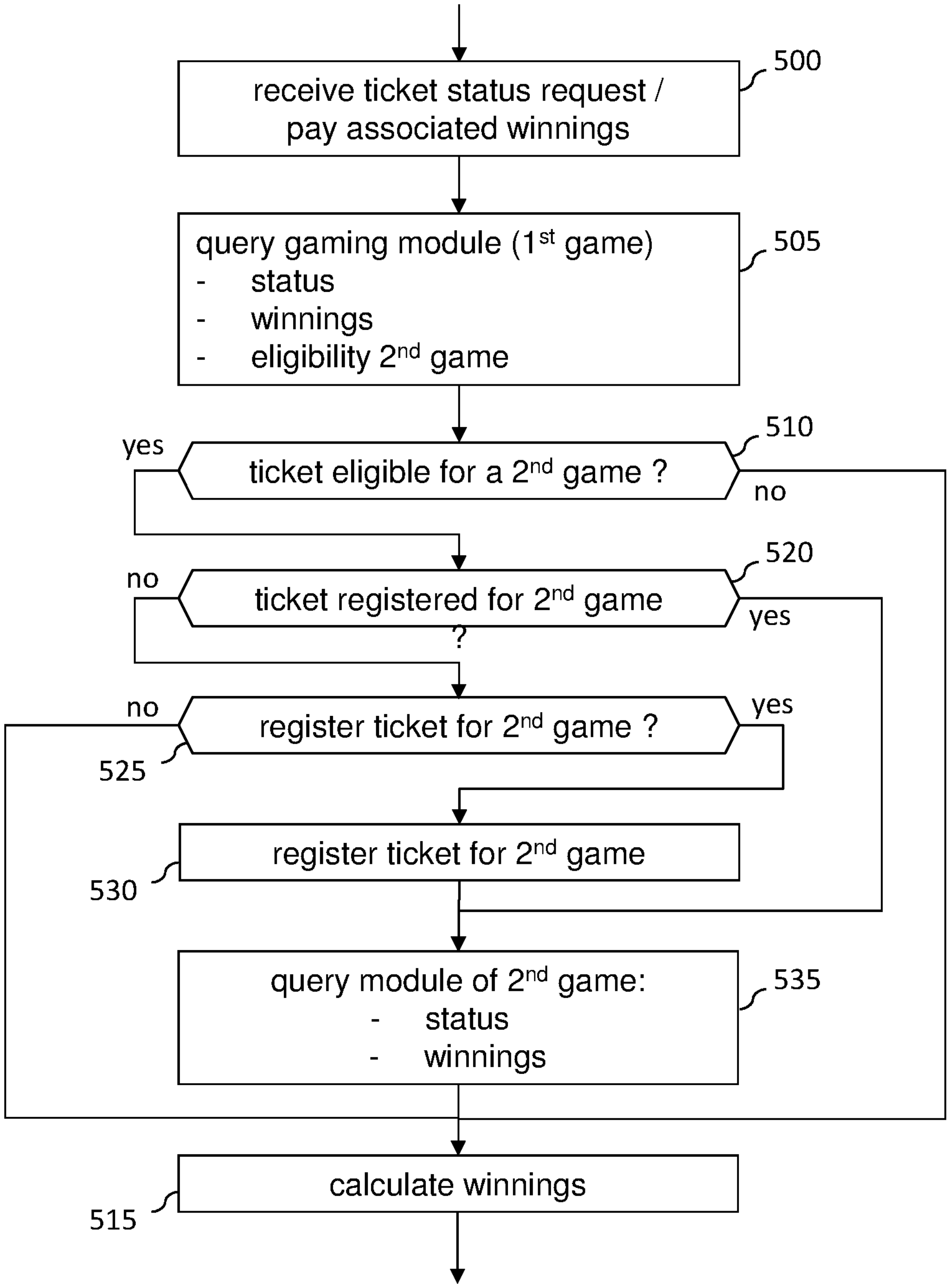
FIG. 5 illustrates an example of steps implemented in a payment and tracking module according to a particular embodiment.

FIG. 5 illustrates an example of steps implemented in a payment and tracking module according to a particular embodiment.

As illustrated, a first step is directed to the reception of a request for obtaining a status of a ticket and/or for payment of winnings corresponding to a participation in the game associated with that ticket (step 500). This request here comprises an identifier of the ticket. As described above, this identifier is unique.

In a following step, a request comprising the received identifier of the ticket is sent to the gaming module corresponding to the game associated with the ticket to obtain a status of the ticket, winnings if any associated with a participation in that game (it being possible for the winnings to be zero) and an information item on eligibility for a second game (step 505). In response, the payment and tracking module receives the requested information.

As described above and according to particular embodiments, all or some of the requested information is directly obtained in the payment and tracking module, this information having been received in advance from the gaming module concerned or having been determined in advance within the payment and tracking module. In particular, winnings may be obtained by the payment and tracking module as soon as they have been calculated by the gaming modules.

In a following step, it is determined whether the ticket is eligible for a participation in a second game (step 510). If the ticket is not eligible for a participation in a second game, the amount of the winnings associated with the ticket considered is calculated as corresponding to the (possible) winnings obtained at the time of the participation in the first game (step 515).

On the contrary, if the ticket is eligible for a participation in a second game, a test is carried out to determine whether the player is already registered to participate in the second game, that is to say whether the ticket is registered for a participation in the second game (step 520). According to some embodiments, this test is carried out by querying the gaming module concerned. Alternatively, this information may be stored in memory in the payment and tracking module when a player accepts the participation in a second game and thus be obtained directly.

If the player is not already registered to participate in the second game, participation therein is offered to him or her (step 525). If he or she accepts to participate therein, a corresponding information item may be stored in memory in the payment and tracking module and a request is sent to the corresponding gaming module to register the player, for example if it is a lottery game, or to play, for example if it is an instant draw game (step 530). It is noted here that the information necessary for the participation in the second game is sent to the gaming module associated with the latter. It may, for example, be an amount of a bet or an amount of winnings associated with the first game.

If the player is registered to participate in the second game (step 520 or 530), a request comprising the identifier of the ticket considered is sent to the corresponding gaming module to obtain the status, for that game, of the ticket which led to that participation, any result or winnings associated with that participation and any information on eligibility for a third game (step 535). In response, the payment and tracking module receives the requested information.

As described above and according to particular embodiments, all or some of the requested information is directly obtained in the payment and tracking module, this information having been received in advance from the gaming module concerned or having been determined in advance within the payment and tracking module. Again, winnings may be obtained by the payment and tracking module as soon as they have been calculated by the gaming modules.

If the ticket is eligible for a participation in other games, the previous steps (steps 510 to 535) are repeated for each additional game.

In a following step the winnings resulting from the participation by the player in different games, for example in the first and in the second games, in connection with a unique ticket, are determined by the payment and tracking module from the information received from the gaming modules (step 515). If the player requests the payment of all or some of the winnings, the payment and tracking module verifies the possibility of such a payment according to the status of the winnings associated with the ticket considered and with particular rules for payment of winnings managed by the payment and tracking module.

The independence of the management of the rules of games and of the rules for management of winnings thus facilitates the development and the implementation of the gaming modules. However, according to some implementations, information on eligibility for additional games may be stored in memory in the payment and tracking module. Tables 1 and 2 appended hereto thus illustrate particular examples of implementation of the invention.

Table 1 hereto illustrates a first example of lists of tickets enabling the management of winnings and the monitoring of operations carried out during the life cycle of a ticket. Each row corresponds to a ticket identified by its identifier, the first row corresponding to the default values. The table gives the winnings obtained and the operations carried out during the life cycle of tickets. The row of default values may be used when a ticket is not identified in the list or to define the default values when a line corresponding to a ticket is added to the list.

According to the illustrated example, the first column matches the identifier of the tickets, the second column corresponds to the amount of the winnings associated with the ticket considered in the first game, or main game (that is to say the game associated with the ticket considered), the third column corresponds to the identifier of a second game, the fourth column indicates the conditions whereby the possibility of participating in the second game is offered or not offered to the user, the fifth column indicates the choice of the holder of the ticket considered to participate or not participate in the second game (if the possibility is not offered to him or her, a corresponding value is, preferably, added automatically), the sixth column corresponds to the amount of the winnings associated with a participation in the second game, or additional game, and the seventh column indicates the status of the ticket.

According to a particular embodiment, the identifier of the ticket comprises the identifier of the game with which the ticket is associated. According to the illustrated example, the first three figures of the identifier of the ticket correspond to the identifier of the game, here 425.

It is noted here that when the possibility of playing a second game is not offered to a player, the identifier of the second game, in the third column, corresponds to a predetermined value providing such an indication, for example the value zero.

The conditions for participation in the second game are, for example, to win at the first game, to lose at the first game, to win an amount of winnings at the first game greater than a predetermined threshold, to win an amount of winnings at the first game less than a predetermined threshold, etc.

It is noted that the winnings obtained further to a participation in the second game may be winnings of a given amount (predetermined or calculated), or may correspond to an operation to be applied to the winnings of the first game, for example to cancel the winnings of the first game if the player loses or to multiply the winnings of the first game by a given factor if the player wins.

The list represented in table 1 is for example created on reception of information from the gaming module of the first game and is supplemented subsequently, in particular when a player decides to participate in a second game, on receiving information from the gaming module of the second game, on receiving a request for payment of winnings, etc.

According to the illustrated example, representing a list of the winnings and of the operations carried out in connection with a game having 425 as identifier, the tickets associated with the game having 425 as identifier offer, by default, the opportunity to their holder to participate in a second game, having 423 as identifier, provided the player lost at the first game. By default, the tickets are in a payable state. By way of illustration, the ticket having identifier 42512923 is a winning ticket in the first game, the winnings being 10. This ticket being a winning ticket, is does not give its holder the possibility of participating in the second game.

Still by way of illustration, it is considered that the ticket having identifier 42531199 is not in the list of the winning tickets provided by the gaming module corresponding to game 1. Therefore, it is considered as a losing ticket. However, when the holder of that ticket connects to the payment and tracking module, it is offered to him or her to participate in the second game (on account of the default values giving the possibility of participating in the second game if the holder lost at the first game). If the holder decides to participate in the second game, a row is preferably created in the list. The winnings associated with the first game is set to the value zero while that associated with the second game is updated further to the second game.

Still by way of illustration, the ticket having identifier 42532689 is a winning ticket in the first game, the winnings being 20. This ticket is associated here with a second game having 112 as identifier (this choice being made by the gaming module associated with the first game). To participate in this second game, the ticket must be a winning ticket in the first game. As indicated in the fifth column, the holder of the ticket has decided to participate in the second game and has won. The ticket here enables its holder of win twice the winnings of the first game, that is to say 40.

Thus, the values presented in the list represent winnings and operations carried out during the life cycle of tickets.

It is noted here that although the examples given above may be limited to a main game and a secondary game, the invention may be implemented with a main game and several secondary games, it being possible for the number of secondary games to be predetermined or associated with the results obtained at earlier games.

Table 2 hereto illustrates a second example of lists of tickets enabling the management of winnings and the tracking of operations carried out during the life cycle of tickets associated with a given game, these operations being relative to that game or to another. Each row corresponds to a ticket identified by its identifier, the first row corresponding to the default values. Again, the row of default values may be used when a ticket is not identified in the list or to define the default values when a line corresponding to a ticket is added to the list.

According to the illustrated example, the first column corresponds to the identifier of the tickets, the second column corresponds to the amount of the winnings associated with the ticket considered with the game with which is associated the list considered, the third column corresponds to the identifier of the identifier of a following game, the fourth column indicates the conditions in which the possibility of participating in the following game is offered or not offered to the user, the fifth column indicates the choice of the holder of the ticket considered to participate or not in the following game (if the possibility is not offered to him or her, a corresponding value is, preferably, added automatically) and the sixth column indicates the status of the ticket. It is noted here that the sixth column may only be used if the game associated with the list considered is directly associated with the tickets whose identifiers are listed.

Several lists may be associated with a same ticket, according to the number of games in which the holder of the ticket considered has participated (there are as many lists as games in which the player has participated). All the lists are consulted to calculate the winnings associated with a ticket.

By way of illustration, the ticket having the identifier 13232681 is a losing ticket in the first game. This ticket here is associated with a second game having 107 as identifier. To participate in this second game, the ticket must be a losing ticket in the first game. The holder has thus been offered to play in the second game, however, as indicated in the fifth column, the holder of the ticket has decided not to participate in the second game.

Figure 6:
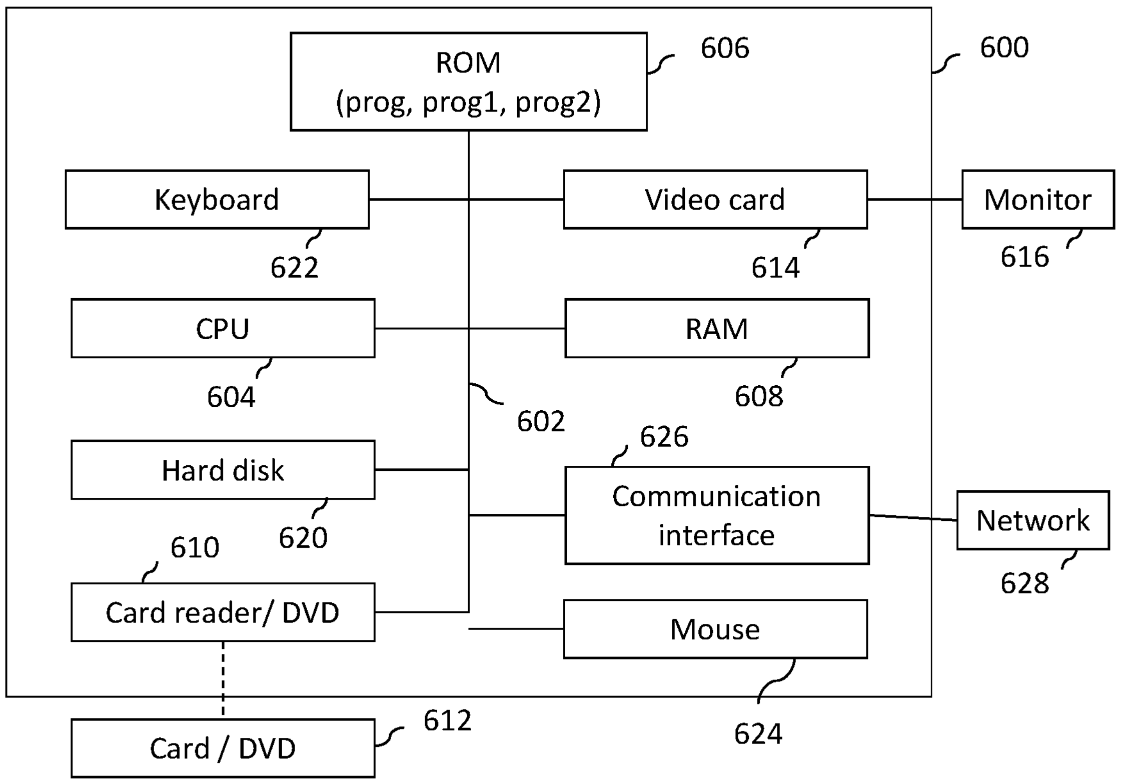
FIG. 6 illustrates an example of a device that can be used to implement, at least partially, embodiments of the invention, in particular steps described with reference to FIGS. 3 to 5.

FIG. 6 illustrates an example of a device able to be used to implement, at least partially, embodiments of the invention, in particular steps described with reference to FIGS. 3 to 5.

The device 600 is for example a server, a computer or a terminal.

The device 600 preferably comprises a communication bus 602 to which are connected:

- a central processing unit (CPU) or microprocessor 604;
- A read only memory 606 (ROM) able to include the operating system and programs such as "Prog";
- a Random Access Memory (RAM) or cache memory 608, comprising registers adapted to record variables and parameters created and modified during the execution of the aforementioned programs; and
- a communication interface 626 connected to a distributed communication network 628, for example a wireless communication network and/or a local communication network, the interface being configured to send and receive data, in particular to and from a device of a user.

Optionally, the device 600 may also have the following elements:

- a hard disk 620 able to contain the aforesaid programs "Prog" and data processed or to be processed according to the invention;
- a keyboard 622 and a mouse 624 or any other pointing device such as an optical stylus, a touch screen or a remote control enabling the user to interact with the programs according to the invention; and
- a reader 610 of a removable storage medium 612 such as a memory card or a disc, for example a DVD disc; and
- a graphics card 614 linked to a screen 616.

The communication bus allows communication and interoperability between the different elements included in the device 600 or connected to it. The representation of the bus is non-limiting and, in particular, the central processing unit may communicate instructions to any element of the device 600 directly or by means of another element of the device 600.

The executable code of each program enabling the programmable apparatus to implement the processes according to the invention may be stored, for example, on the hard disk 620 or in read only memory 606.

According to a variant, the executable code of the programs can be received by the intermediary of the communication network 628, via the interface 626, in order to be stored in an identical fashion to that described previously.

More generally, the program or programs may be loaded into one of the storage means of the device 600 before being executed.

The central processing unit 604 will control and direct the execution of the instructions or portions of software code of the program or programs according to the invention, these instructions being stored on the hard disk 620 or in the read-only memory 606 or in the other aforementioned storage elements. On powering up, the program or programs which are stored in a non-volatile memory, for example the hard disk 620 or the read only memory 606, are transferred into the random-access memory 608, which then contains the executable code of the program or programs according to the invention, as well as registers for storing the variables and parameters necessary for implementation of the invention.

According to the embodiment chosen, certain acts, actions, events or functions of each of the methods described in the present document may be carried out or occur in a different order than that in which they have been described, or may be added, merged or not carried out or not occur, according to the case. Furthermore, in some embodiments, certain acts, actions or events are carried out or occur concurrently and not successively.

Although described through a certain number of detailed examples, the method provided and the equipment for the implementation of the method comprise different variants, modifications and improvements which will be obviously apparent to the person skilled in the art, it being understood that these different variants, modifications and improvements form part of the scope of the invention, as defined by the following claims. Furthermore, different aspects and features described above may be implemented together, or separately, or else be substituted for each other, and all the different combinations and sub-combinations of the aspects and features form part of the scope of the invention. Furthermore, it may be that some systems and equipment described above do not incorporate all the modules and functions described for the preferred embodiments.

TABLE 1

| Ticket ID | Winning amount game 1 | ID $2^{nd}$ game | $2^{nd}$ game conditions | Player choice | Winning amount game 2 | Status |
|---|---|---|---|---|---|---|
| default | 0 | 423 | lost | — | — | payable |
| 42583198 | 15 | 423 | lost | — | — | payable |
| 42512923 | 10 | 423 | lost | — | — | paid |
| . . . | . . . | . . . | . . . | . . . | . . . | . . . |
| 42532681 | 20 | 112 | won | 0 (no) | — | blocked |
| 42532689 | 20 | 112 | won | 1 (yes) | ×2 | payable |
| . . . | . . . | . . . | . . . | . . . | . . . | . . . |

TABLE 2

| Ticket ID | game winnings amount | Following game ID | Following game conditions | Player choice | Status |
|---|---|---|---|---|---|
| default | 0 | 107 | lost | — | payable |
| 13283198 | 5 | 107 | lost | — | payable |
| 13212923 | 30 | 218 | won | 1 (yes) | blocked |
| . . . | . . . | . . . | . . . | . . . | . . . |
| 13232681 | 0 | 107 | lost | 0 (no) | payable |
| . . . | . . . | . . . | . . . | . . . | . . . |

The invention claimed is:

1. A method for managing game winnings in a computer system comprising a plurality of independent gaming modules and a winnings management module distinct from the gaming modules, the method being implemented in the winnings management module and comprising:

- obtaining a winnings information item, relating to a participation in a game of a first type, and an information item on eligibility for a game of a second type, the game of the second type being different from the game of the first type, the information items obtained on winnings and eligibility being received from a first gaming module associated with the game of the first type and being obtained according to at least one identifier of a ticket;
- obtaining a winnings information item relative to a participation in the game of the second type in relation with the identifier of the ticket, the winnings information item relative to the participation in the game of the second type being obtained from a second gaming module associated with the game of the second type; and estimating winnings associated with the identifier of the ticket according to the winnings information items received.

2. The method according to claim 1, further comprising sending, to the second gaming module, a registration request for registering a participation in the second game, the registration request being associated with the identifier of the ticket.

3. The method according to claim 2, further comprising sending the estimated winnings, an instruction for payment of the estimated winnings and a modification of a status associated with the ticket.

4. The method according to claim 2, wherein obtaining a winnings information item comprises querying a data structure received in advance of the participation in the game at the origin of the winnings considered.

5. The method according to claim 2, further comprising determining a status associated with the ticket.

6. The method according to claim 2, wherein the ticket is a physically-based ticket.

7. The method according to claim 1, further comprising sending the estimated winnings, an instruction for payment of the estimated winnings and a modification of a status associated with the ticket.

8. The method according to claim 7, wherein obtaining a winnings information item comprises querying a data structure received in advance of the participation in the game at the origin of the winnings considered.

9. The method according to claim 7, further comprising determining a status associated with the ticket.

10. The method according to claim 1, wherein obtaining a winnings information item comprises querying a data structure received in advance of the participation in the game at the origin of the winnings considered.

11. The method according to claim 10, further comprising determining a status associated with the ticket.

12. The method according to claim 1, wherein obtaining a winnings information item comprises sending a request comprising the identifier of the ticket to a gaming module and receiving the winnings information item considered.

13. The method according to claim 12, further comprising determining a status associated with the ticket.

14. The method according to claim 1, further comprising determining a status associated with the ticket.

15. The method according to claim 14, wherein estimating winnings associated with the identifier of the ticket according to the winnings information items obtained is carried out according to the status associated with the ticket.

16. The method according to claim 1, wherein the ticket is a physically-based ticket.

17. The method of claim 16, wherein the physically-based ticket is a scratch card.

18. The method of claim 16, wherein the physically-based ticket is a virtual ticket.

19. A non-transitory computer-readable medium on which is stored a computer program comprising instructions for implementing each of the steps of the method according to claim 1, when that program is executed by a processor.

20. A device comprising a processing unit configured for executing each of the steps of the method according to claim 1.

* * * * *